April 30, 1940.   A. L. BOEGEHOLD   2,198,801
ANNEALING MALLEABLE IRON
Filed Oct. 24, 1936
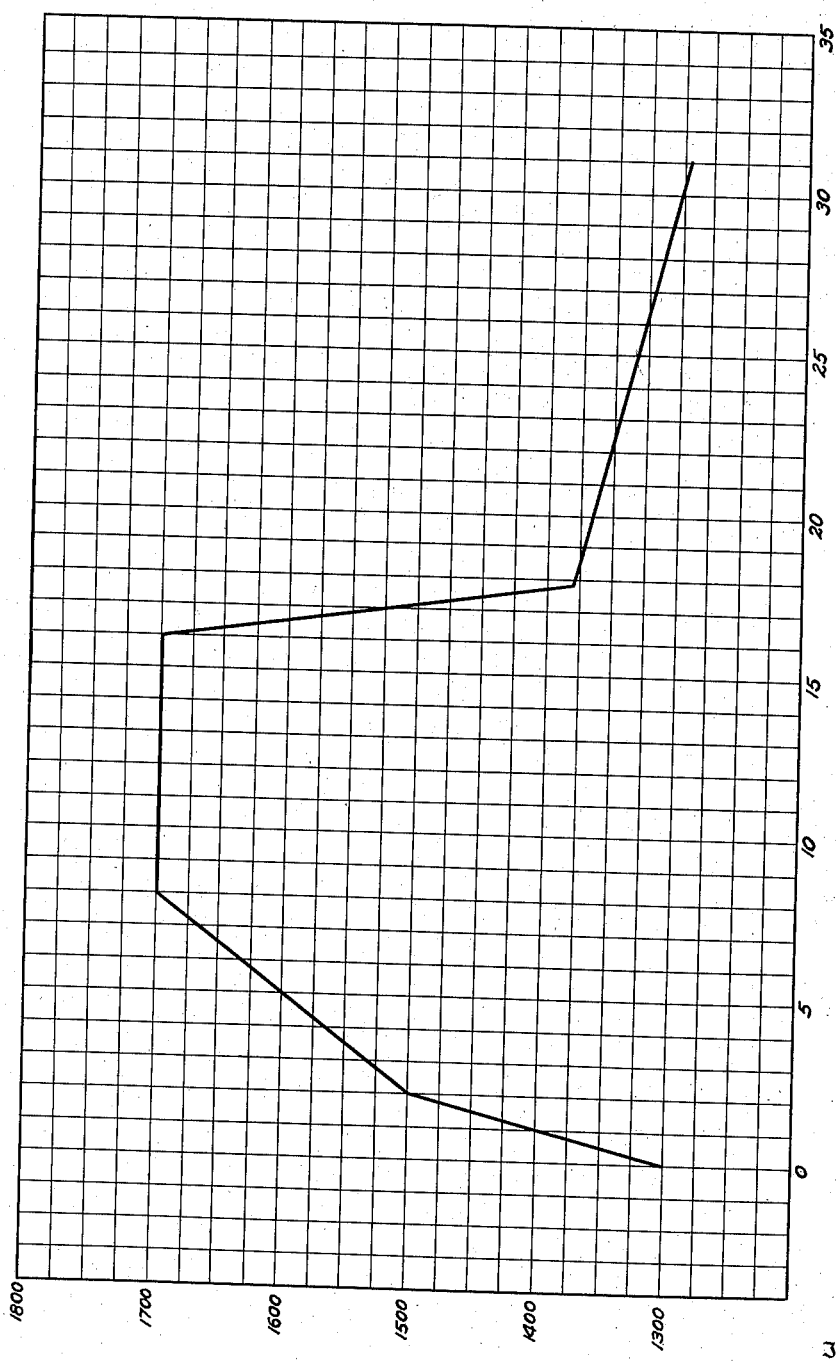
Inventor
Alfred L. Boegehold
By Blackmor, Spencer & Hunt
Attorneys Patented Apr. 30, 1940

2,198,801

UNITED STATES PATENT OFFICE 2,198,801

ANNEALING MALLEABLE IRON

Alfred L. Boegehold, Detroit, Mich., assignor to General Motors Corporation, Detroit, Mich., a corporation of Delaware Application October 24, 1936, Serial No. 107,357

2 Claims. (Cl. 148—21.8)

This invention relates to a process of heat treating white iron castings to convert them into malleable iron products.

The object of the invention is to convert white iron castings within a short annealing period into malleable iron products of prime quality having the temper carbon distributed throughout the ferrite matrix in numerous closely disposed fine nodules.

White iron is composed mainly of iron and iron carbide, a part of which is in the form of massive cementite; and this invention consists in heating white iron castings to the temperature at which the massive cementite in the castings begins to decompose; then heating the castings to a higher temperature at a rate that promotes further decomposition of cementite and formation and even distribution of temper carbon in small closely disposed nodules even in castings of thick cross section; maintaining said higher temperature until all massive cementite is decomposed, then cooling slowly to the temperature slightly higher than that at which ferrite appears in the micro-structure (about 1380° F.) during which time additional excess cementite precipitates and quickly decomposes into free carbon and ferrite, and thereafter cooling to a lower temperature slowly enough to complete graphitization of all remaining combined carbon.

The accompanying drawing is a chart on which is drawn a graphic curve representing an annealing cycle in accordance with this invention. The numerals arranged in vertical column at the left-hand edge of the chart represent temperature in degrees Fahrenheit, and the numerals arranged in horizontal series at the lower edge of the chart represent time in hours.

Malleable iron products in which the temper carbon is distributed thickly throughout the ferrite matrix in fine nodules can be produced in a shorter annealing time than malleable iron products having the temper carbon in coarse nodules more widely separated in the matrix. Malleable iron castings of small cross section in which the temper carbon is distributed in fine nodules are known; but malleable iron castings of large cross section nearly always have coarse and widely separated masses of temper carbon. In order to anneal white iron castings of both large and small section in such manner that the resulting product may have the fine temper carbon masses as described the castings are subjected to the short heat treatment or annealing cycle now to be described.

Molten iron to be poured into hard castings capable of being converted by heat treatment into relatively soft malleable products, may be produced by any approved process as, for example, by that disclosed in Patent No. 1,835,791, pig iron, steel and other scrap being charged into the melting furnace in proportions suitable to produce a molten iron of the desired analysis.

The hard and brittle castings of white iron made by the process disclosed in said patent, or by any suitable process, may be converted into relatively soft and malleable articles by introducing them according to known methods into an annealing oven or kiln and therein subjecting them to the improved heat treatment of this invention.

Having been introduced into the annealing oven or kiln the castings are heated to that temperature at which the massive cementite of the iron begins to decompose and temper carbon to form in appreciable quantities. This temperature is in the neighborhood of 1500° F. The rate of increase from the temperature of the castings when introduced into the oven to the temperature of 1500° F. or thereabouts may be about 200° F. per hour or any desired rate.

After that temperature at which temper carbon nodules begin to form has been attained (1500° F. or thereabouts), the temperature is increased to 1700° F. or higher at a rate that will permit or promote the formation of fine closely disposed or somewhat crowded nodules of temper carbon in the ferrite matrix even in castings of large cross section. This heat increase from about 1500° F. to 1700° F. or higher should be at the rate of about 35° per hour in a period not to exceed eight hours in order that elimination of all massive cementite then included in the castings may be accomplished in the next ensuing period. After the castings have reached said temperature of 1700° F. or higher, they are held at that temperature until all massive cementite is decomposed. This should require not over eight hours and probably considerably less depending on the size of the castings.

After all massive cementite has been decomposed at said temperature of 1700° F. or upwards the castings are cooled to about 1400° F. or to a temperature in that neighborhood which is slightly higher than that at which ferrite appears in the microstructure. The cooling at this stage should be rapid and may be at the rate of 150° F. per hour from said temperature of 1700° F. or higher to said temperature of about 1400° F.

During the period of reduction of temperature to about 1400° F. some massive cementite is formed in the castings being heat treated, as the amount of carbide soluble in iron decreases with temperature, the decrease thus causing precipitation of cementite out of solid solution. This cementite is small in amount and quickly decomposes. In order to completely decompose the combined carbon remaining in an amount such as will saturate the iron at 1400° F., the castings should be cooled to 1300° F., or a little lower, at a slow rate. The rate of cooling from about 1400° F. to 1300° F. or below should be approximately 10° F. per hour.

The total time elapsed from the time when the rising heat during the annealing cycle reached 1300° F. and until 1300° F. is reached during the period of decreasing heat should not be more than 30 hours for castings including those of which the rate of solidification and cooling in the mold is as slow or slower than that of a bar ⅞" square and eight or more inches long.

By heating white iron castings at any convenient rate to about 1500° F. and then heating them from about 1500° F. to 1700° F. or slightly above, at the rate of 35° F. per hour, as described, followed by the heat treatment specified, malleable iron develops thickly distributed fine temper carbon nodules even in heavy castings of large cross section which when heated more rapidly through said temperature range contain coarse temper carbon nodles. As a result of the fine temper carbon formation the speed of graphitization is greatly accelerated and the total time required for complete annealing is considerably reduced.

I claim:

1. A process of converting white iron castings into malleable iron which consists in heating the castings at any convenient rate to a temperature of about 1500° F; then raising the temperature from about 1500° F. to somewhat above 1700° F. at the rate of about 35° an hour; maintaining said last mentioned temperature for not over eight hours; cooling to a temperature of about 1400° F. at the rate of about 150° F. per hour; and then cooling from about 1400° F. to slightly below 1300° F. at the rate of about 10° F. per hour.

2. A process of converting white iron castings into malleable iron which consists in heating said castings at any convenient rate to a temperature of about 1500° F., heating from about 1500° F. to at least 1700° F. at about 35° F. per hour in not over eight hours; maintaining said last mentioned temperature until all massive cementite is decomposed; cooling from said last mentioned temperature as fast as convenient to about 1400° F., then cooling from 1400° F. to below 1300° F. slowly enough to complete graphitization of all combined carbon remaining in the castings.

ALFRED L. BOEGEHOLD.